United States Patent
Tamboli et al.

(10) Patent No.: US 10,571,923 B2
(45) Date of Patent: Feb. 25, 2020

(54) SYSTEM AND METHOD FOR STEERING CONTROL DURING AUTONOMOUS VEHICLE DRIVING

(71) Applicant: Tata Consultancy Services Limited, Mumbai (IN)

(72) Inventors: Asif Tamboli, Pune (IN); Vinayak Dhondiba Sonawane, Pune (IN); Akshay Saraf, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 52 days.

(21) Appl. No.: 15/937,733

(22) Filed: Mar. 27, 2018

(65) Prior Publication Data

US 2019/0086929 A1 Mar. 21, 2019

(30) Foreign Application Priority Data

Sep. 20, 2017 (IN) .............. 201721033372

(51) Int. Cl.
*G05D 1/02* (2020.01)
*G05D 1/00* (2006.01)
*B62D 6/00* (2006.01)
*G06N 3/04* (2006.01)
(Continued)

(52) U.S. Cl.
CPC ........... *G05D 1/0214* (2013.01); *B60W 30/00* (2013.01); *B62D 6/001* (2013.01); *B62D 15/025* (2013.01); *B62D 15/0255* (2013.01); *G05D 1/0088* (2013.01); *G05D 1/0221* (2013.01);
(Continued)

(58) Field of Classification Search
CPC . B60W 30/00; B62D 15/025; B62D 15/0255; B62D 6/001; G05D 1/0088; G05D 1/0214; G05D 1/0221; G06N 3/04; G06N 3/0445; G06N 3/0454
See application file for complete search history.

(56) References Cited

U.S. PATENT DOCUMENTS

| 6,748,302 B2 * | 6/2004 | Kawazoe | B62D 15/025 |
| | | | 340/937 |
| 7,308,432 B2 * | 12/2007 | Torii | B60G 17/0162 |
| | | | 706/21 |

(Continued)

FOREIGN PATENT DOCUMENTS

KR    10-2011-0023160    3/2011

*Primary Examiner* — Babar Sarwar
(74) *Attorney, Agent, or Firm* — Finnegan, Henderson, Farabow, Garrett & Dunner LLP

(57) ABSTRACT

Automatic steering control is essential part for autonomous vehicle which controls the steering in various scenarios to achieve safe and comfortable driving. The present subject matter discloses a system and method for steering control during autonomous vehicle driving using neural networks. In an embodiment, a lane side offset, a radius of curvature and a speed of a vehicle are received. Further, an ideal steering angle required to keep the vehicle at a center of a lane is determined using the radius of curvature. Furthermore, an offset error is determined based on the lane side offset using a reference offset. In addition, a corrective steering angle is determined using the radius of curvature, speed of the vehicle and offset error. Also, a steering angle required to keep the vehicle at a center of a lane is computed using the ideal steering angle and the corrective steering angle.

15 Claims, 8 Drawing Sheets

(51) Int. Cl.
*B60W 30/00* (2006.01)
*B62D 15/02* (2006.01)
(52) U.S. Cl.
CPC ............ *G06N 3/04* (2013.01); *G06N 3/0445* (2013.01); *G06N 3/0454* (2013.01)

(56) References Cited

U.S. PATENT DOCUMENTS

| | | | | |
|---|---|---|---|---|
| 7,765,066 | B2* | 7/2010 | Braeuchle | B60W 30/095 382/103 |
| 8,311,729 | B2* | 11/2012 | Saito | G08G 1/165 701/117 |
| 8,533,135 | B2* | 9/2013 | Shimizu | H04L 41/0631 706/12 |
| 8,600,657 | B2* | 12/2013 | Saito | B60T 7/22 701/301 |
| 8,626,391 | B2* | 1/2014 | Kim | B62D 15/025 701/1 |
| 9,393,998 | B2* | 7/2016 | Clarke | B60T 7/12 |
| 10,196,086 | B2* | 2/2019 | Gupta | B62D 5/0457 |
| 2009/0319113 | A1* | 12/2009 | Lee | B62D 15/025 701/25 |
| 2010/0228420 | A1* | 9/2010 | Lee | B62D 1/28 701/26 |
| 2012/0283912 | A1* | 11/2012 | Lee | B62D 1/286 701/41 |
| 2014/0088830 | A1* | 3/2014 | Roh | B62D 15/025 701/41 |
| 2018/0043931 | A1* | 2/2018 | Gupta | B62D 5/0457 |

* cited by examiner

SYSTEM AND METHOD FOR STEERING CONTROL DURING AUTONOMOUS VEHICLE DRIVING

PRIORITY CLAIM

This U.S. patent application claims priority under 35 U.S.C. § 119 to India Patent Application No. 201721033372, filed on Sep. 20, 2017. The entire contents of the aforementioned application are incorporated herein by reference.

TECHNICAL FIELD

The embodiments herein generally relate to autonomous vehicle driving, and, more particularly, to system and method for steering control during autonomous vehicle driving.

BACKGROUND

Automatic steering control is essential part for autonomous vehicle which controls the steering in various scenarios to achieve safe and comfortable driving. Existing active steering assistance methods automatically provide assistance to adjust the steering angle to follow the road. However, hands free steering control is required for autonomous driving along with capability of lane change. For example, If lane in which vehicle is traveling is going to merge, lane change is essential. For autonomous vehicle, lane change is expected to happen automatically.

SUMMARY

Embodiments of the present disclosure present technological improvements as solutions to one or more of the above-mentioned technical problems recognized by the inventors in conventional systems. In view of the foregoing, embodiments herein provide methods and systems for steering control during autonomous vehicle driving.

In one embodiment, a processor-implemented method includes steps of: receiving a lane side offset from a camera mounting position on a vehicle, a radius of curvature and a speed of the vehicle; determining an ideal steering angle required to keep the vehicle at a center of a lane using the radius of curvature; determining an offset error based on the lane side offset using a reference offset; determining a corrective steering angle using on the radius of curvature, speed of the vehicle and offset error; and computing a steering angle required to keep the vehicle at a center of a lane using the ideal steering angle and the corrective steering angle.

In another embodiment, a system for steering control during autonomous vehicle driving provided. In an embodiment, the system includes one or more memories; and one or more hardware processors, the one or more memories coupled to the one or more hardware processors wherein the one or more hardware processors are configured to execute programmed instructions stored in the one or more memories to: receive a lane side offset from a camera mounting position on a vehicle, a radius of curvature and a speed of the vehicle; determine an ideal steering angle required to keep the vehicle at a center of a lane using the radius of curvature; determine an offset error based on the lane side offset using a reference offset; determine a corrective steering angle using on the radius of curvature, speed of the vehicle and offset error; and compute a steering angle required to keep the vehicle at a center of a lane using the ideal steering angle and the corrective steering angle.

In yet another embodiment, a non-transitory computer-readable medium having embodied thereon a computer program for executing a method for steering control during autonomous vehicle driving is provided. The method includes the steps of: receiving a lane side offset from a camera mounting position on a vehicle, a radius of curvature and a speed of the vehicle; determining an ideal steering angle required to keep the vehicle at a center of a lane using the radius of curvature; determining an offset error based on the lane side offset using a reference offset; determining a corrective steering angle using on the radius of curvature, speed of the vehicle and offset error; and computing a steering angle required to keep the vehicle at a center of a lane using the ideal steering angle and the corrective steering angle.

It is to be understood that both the foregoing general description and the following detailed description are exemplary and explanatory only and are not restrictive of the invention, as claimed.

BRIEF DESCRIPTION OF THE FIGURES

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a technique to control steering for autonomous driving which is extended to lane change. This technique controls the steering using artificial intelligent for keeping the vehicle within the lane and also lane change. The technique uses a neural network architecture, which is possible to train on actual vehicle data which can make control more precise and easy to deploy on various variant of vehicles with changing only neural weights.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for steering control during autonomous vehicle driving, has been explained in details with respect to the FIGS. 1 through 6. While aspects of described methods and systems for steering control during autonomous vehicle driving can be implemented in any number of different systems, utility environments, and/or configurations, the embodiments are described in the context of the following exemplary system(s).

Figure 1:
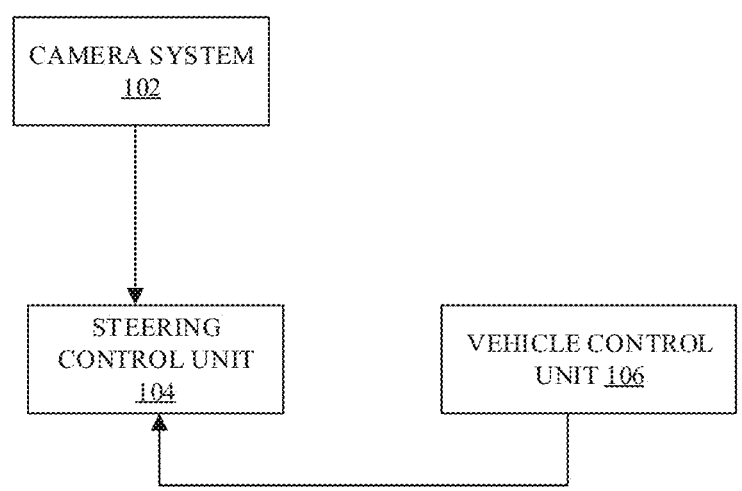
FIG. 1 illustrates a block diagram of a system for steering control during autonomous vehicle driving, in accordance with some embodiments of the present disclosure.

FIG. 1 illustrates a block diagram of a system 100 (e.g., a vehicle) for steering control during autonomous vehicle driving, in accordance with some embodiments of the present disclosure. As shown in FIG. 1, the vehicle 100 includes a camera system 102, a steering control unit 104 and a vehicle control unit 108. In an embodiment, the camera system 102 identifies lane information, such as an offset of vehicle from left side and right side of vehicle, curvature of lane and so on and send the identified information to the steering control unit 104. The steering control unit 104 then identifies a steering angle required to perform vehicle maneuvering in different scenarios like lane keeping at center, lane changing, and taking U turn. This is explained in more detail with reference to FIG. 2. Further, the vehicle control unit 106 receives and applies the steering angle to a vehicle electromechanical system and provides feedback (i.e., current steering angle and a speed of the vehicle) to the steering control unit 104.

Figure 2:
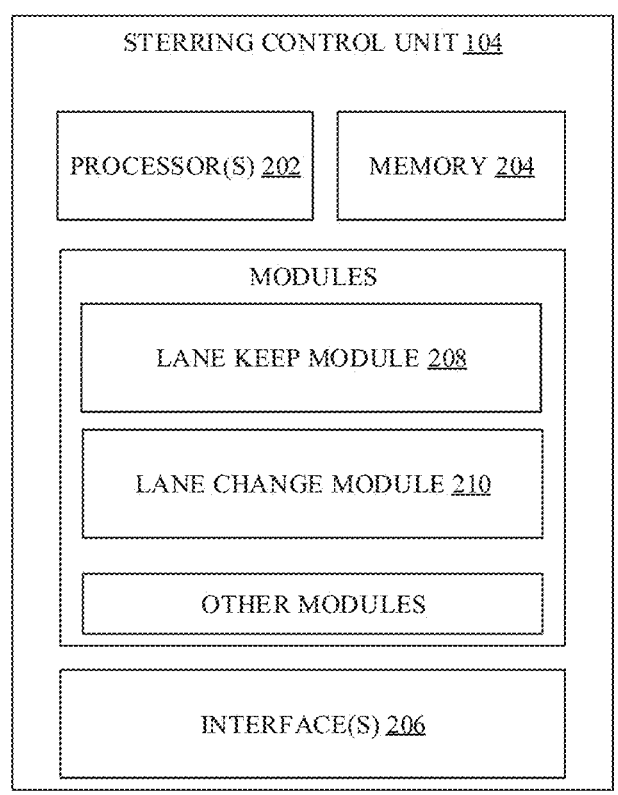
FIG. 2 illustrates a block diagram of a steering control unit, shown in FIG. 1, in accordance with some embodiments of the present disclosure.

FIG. 2 illustrates a block diagram of a steering control unit 104, shown in FIG. 1, in accordance with some embodiments of the present disclosure. In an example embodiment, the steering control unit 104 may be embodied in, or is in direct communication with a computing device. The steering control unit 104 includes or is otherwise in communication with one or more hardware processors such as processor(s) 202, one or more memories such as a memory 204, and a network interface unit such as a network interface unit 206. In an embodiment, the processor 202, memory 204, and the network interface unit 206 may be coupled by a system bus such as a system bus or a similar mechanism. Although FIG. 2 shows example components of the unit 104, in other implementations, the unit 104 may contain fewer components, additional components, different components, or differently arranged components than depicted in FIG. 2.

The processor 202 may include circuitry implementing, among others, audio and logic functions associated with the communication. For example, the processor 202 may include, but are not limited to, one or more hardware processors, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation DSP hardware, network processor, application specific integrated circuit (ASIC), FPGA, read only memory (ROM) for storing software, random access memory (RAM), and non-volatile storage. Other hardware, conventional, and/or custom, may also be included.

The interface(s) 206 may include a variety of software and hardware interfaces, for example, interfaces for peripheral device(s), such as a keyboard, a mouse, an external memory, and a printer. The interface(s) 206 can facilitate multiple communications within a wide variety of networks and protocol types, including wired networks, for example, local area network (LAN), cable, etc., and wireless networks, such as Wireless LAN (WLAN), cellular, or satellite.

The one or more memories such as a memory 204, may store any number of pieces of information, and data, used by the system to implement the functions of the system. The memory 204 may include for example, volatile memory and/or non-volatile memory. Examples of volatile memory may include, but are not limited to volatile random access memory. The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the system 200 to carry out various functions in accordance with various example embodiments. Additionally or alternatively, the memory 204 may be configured to store instructions which when executed by the processor 202 causes the system to behave in a manner as described in various embodiments. The memory 204 includes a lane keep module 208, a lane change module 210 and other modules. The modules 208, 210 and other modules include routines, programs, objects, components, data structures, etc., which perform particular tasks or implement particular abstract data types. The other modules may include programs or coded instructions that supplement applications and functions of the unit 104.

Figure 3A:
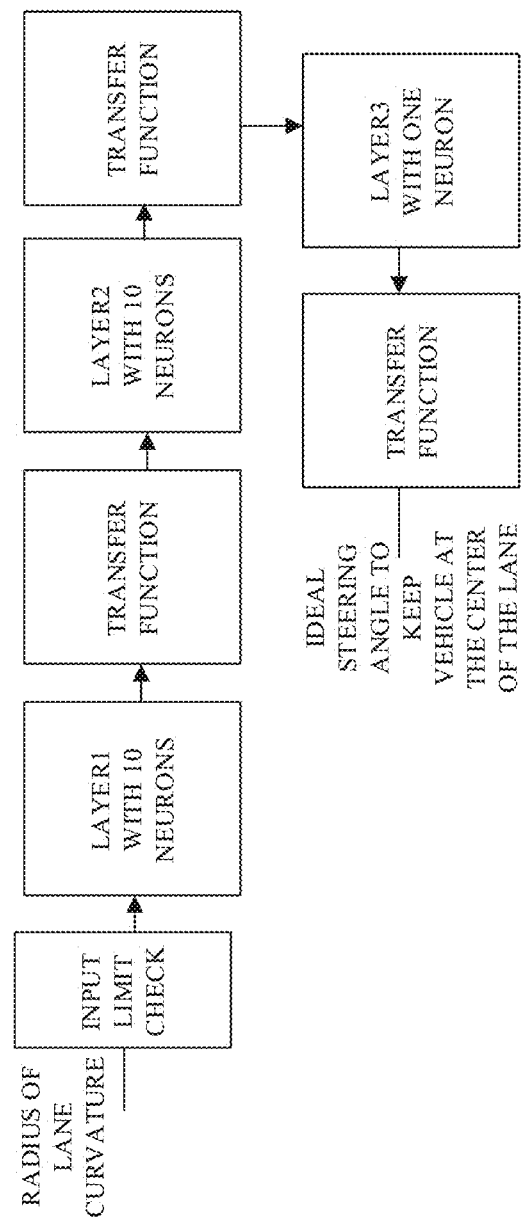
FIG. 3A illustrates a structural block diagram of a feed forward neural network, in accordance with some embodiments of the present disclosure.
Figure 3B:
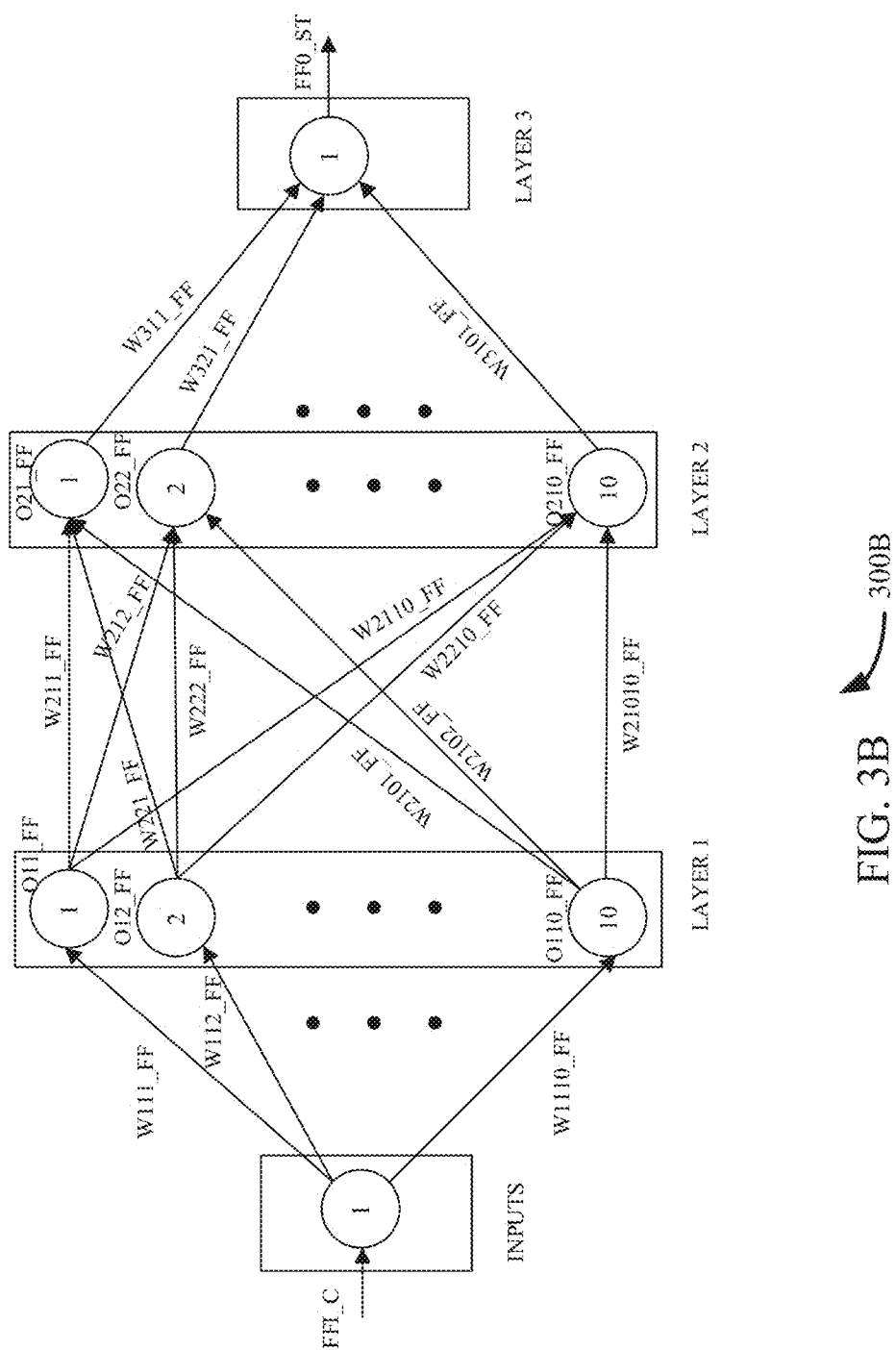
FIG. 3B illustrates an architecture of the feed forward neural network, in accordance with some embodiments of the present disclosure.

In operation, the lane keep module 208 receives a lane side offset from a camera mounting position on the vehicle, a radius of curvature and a speed of the vehicle from the vehicle control unit 106. For example, a lane side offset is a left lane side offset. Further, the lane keep module 208 determines an ideal steering angle required to keep the vehicle at a center of a lane using the radius of curvature. In an example implementation, the lane keep module 208 inputs the radius of curvature to a first neural network. For example, the first neural network includes a feed forward neural network. Further, the lane keep module 208 determines the ideal steering angle required to keep the vehicle at the center of the lane using the feed forward neural network. Example feed forward neural network structural block diagram and an architecture are shown in FIGS. 3A and 3B.

Figure 4A:
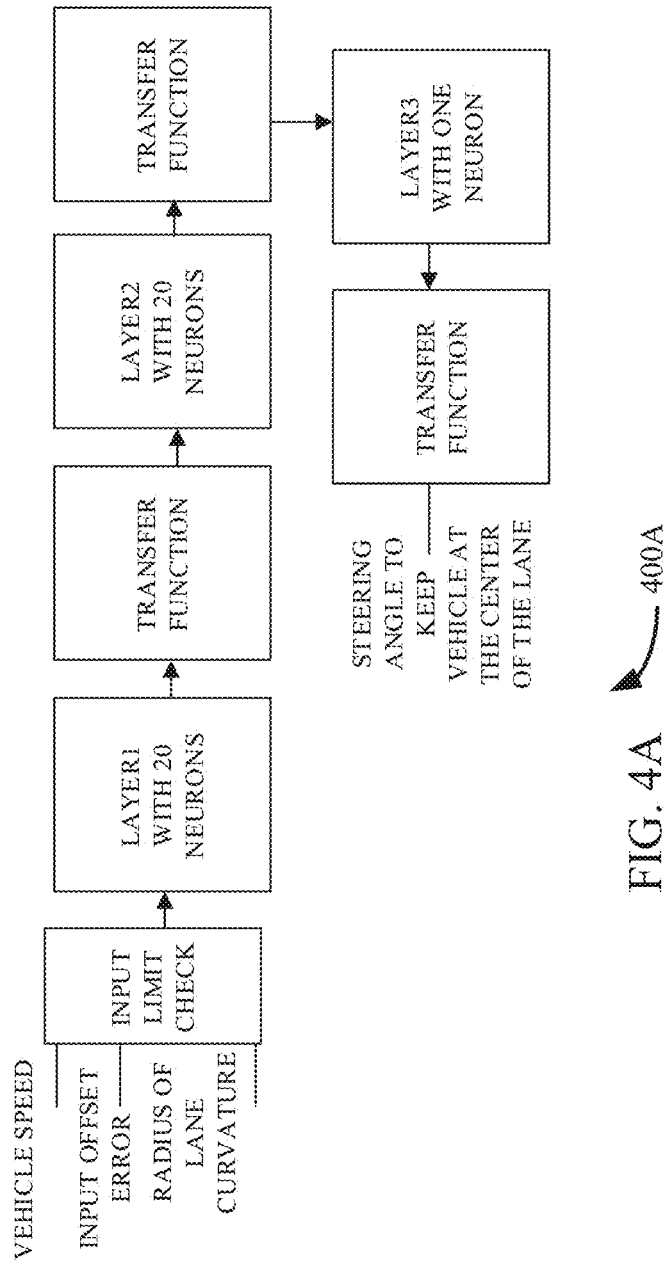
FIG. 4A illustrates a structural block diagram of a feedback neural network, in accordance with some embodiments of the present disclosure.
Figure 4B:
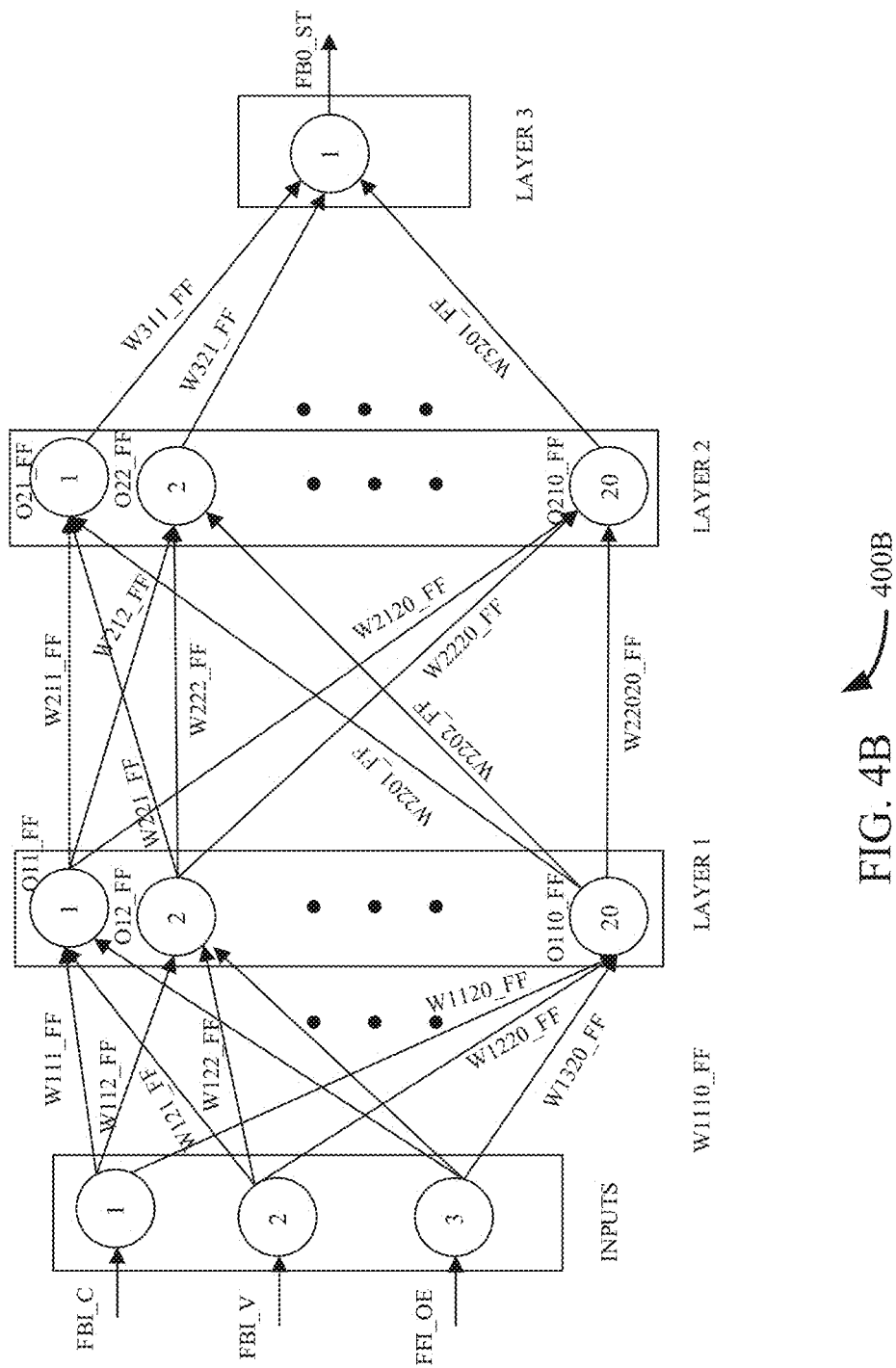
FIG. 4B illustrates an architecture of the feedback neural network, in accordance with some embodiments of the present disclosure.
Figure 5:
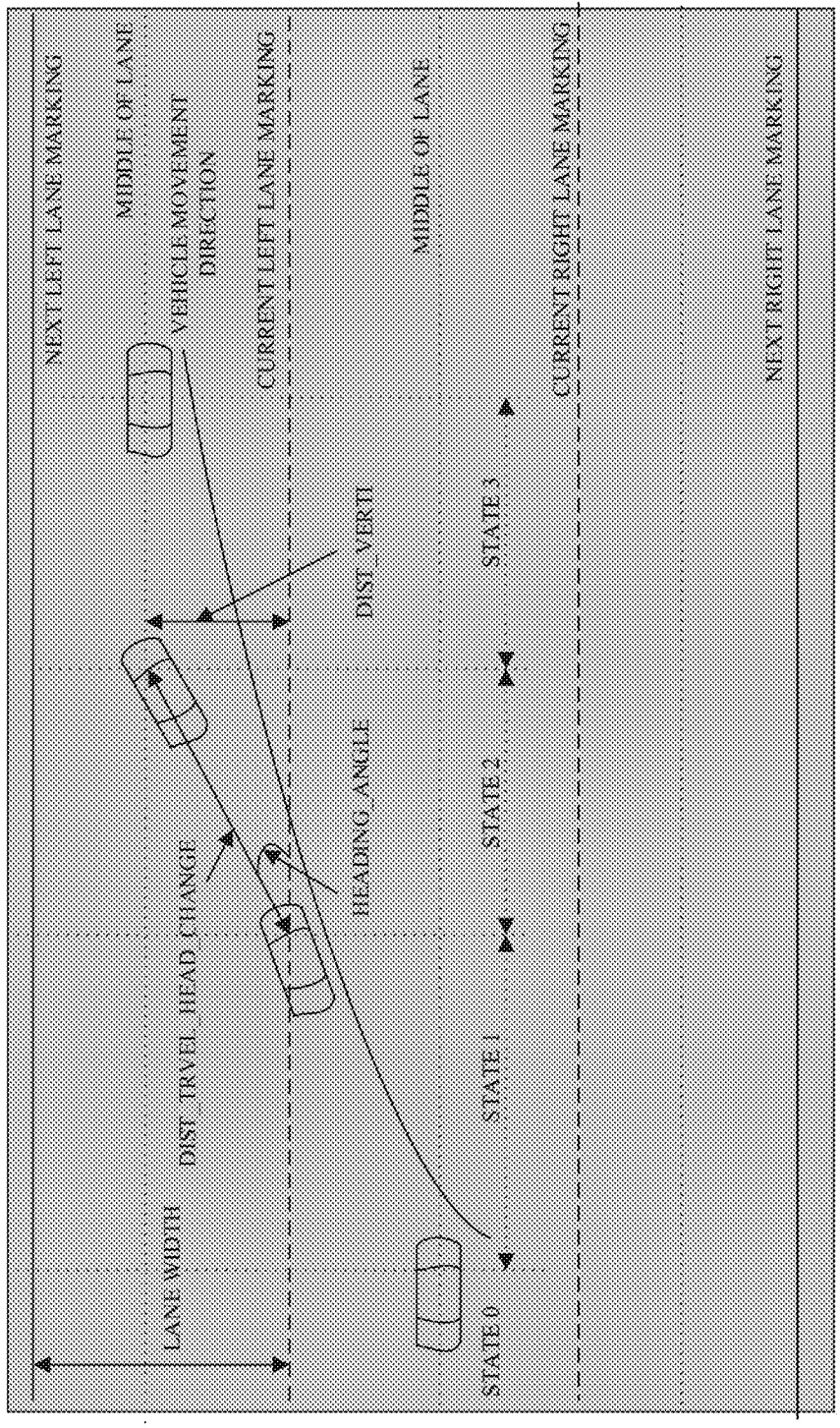
FIG. 5 is a diagram showing a lane change operation during autonomous vehicle driving, in accordance with some embodiments of the present disclosure.

Furthermore, the lane keep module 208 determines an offset error based on the lane side offset using a reference offset. Then the lane keep module 208 determines a corrective steering angle using the radius of curvature, speed of the vehicle and offset error. In an example implementation, the lane keep module 208 inputs the radius of curvature, speed of the vehicle and offset error to a second neural network (e.g., feedback neural network). The lane keep module 208 then determines the corrective steering angle required to keep the vehicle at the center of the lane using the feedback neural network. Example feedback neural network structural block diagram and an architecture are shown in FIGS. 4A and 4B.

In addition, the lane keep module 208 computes a steering angle required to keep the vehicle at a center of a lane using the ideal steering angle and the corrective steering angle. In an example embodiment, the lane keep module 208 determines the steering angle by adding the ideal steering angle and the corrective steering angle.

In some embodiments, the lane keep module 208 determines a steering angle to move the vehicle to an end of a current lane by modifying the offset error. For example, the lane keep module 208 determines the steering angle to move the vehicle to the end of left side or right side of the current lane. Upon reaching the end of the current lane marking, the lane change module 210 performs a lane change operation based on visibility of next lane marking.

In an example implementation, a lane change operation on a left side of the vehicle, once the vehicle has crossed a current left lane marking, if next left lane marking or right lane marking is visible to the camera system, the lane change module 210 pass the control to the lane keep module 208 and complete the lane change operation. If next left lane marking is not visible to the camera system and the camera system is providing offset from the current left lane marking after crossing the current left lane, then the lane change module 210 calculates a lane offset error input to the lane keep module 208 to keep the vehicle at the center of next lane using the offset from the current left lane offset. For example, the lane offset error is calculated using the following equation.

Lane offset error=(Lane_width−Offset from the current left lane)−(Lane_width/2).

If next left lane is visible to the camera system before traveling a Dist_Trvel_Head_Change meter distance, the lane change module 210 pass the control to the lane keep module 208 and complete the lane change operation. For example, the Dist_Trvel_Head_Change distance is calculated using the following equation.

Dist_Trvel_Head_Change=Dist_verti/Sin(Heading_angle)

where Dist_verti (i.e., Lane_width/2) is a vertical perpendicular distance between a point on middle of next lane where the vehicle crosses the middle of next lane till current left lane marking and Heading_angle is an angle between the vehicle heading and the current left lane marking.

If next left lane is not visible to the camera system after traveling the Dist_Trvel_Head_Change meter distance and the current lane marking is not visible, the lane change module 210 changes the steering angle in opposite direction with same value as used to move the vehicle at the end of the current left lane marking and pass the control to the lane keep module 208 for completing the lane change operation. If next left lane marking, next right lane marking and current left lane marking is not visible to the camera system after crossing the current left lane, then travel for Dist_Trvel_Head_Change meter with current steering angle. Then the lane change module 210 changes the steering angle in opposite direction with same value as used to move the vehicle at the end of the current left lane marking and pass the control to the lane keep module 208 for completing the lane change operation. This is shown in detail with reference to the diagram 500 of FIG. 5.

FIG. 3A illustrates a structural block diagram 300A of a feed forward neural network, in accordance with some embodiments of the present disclosure. As shown in FIG. 3A, the feed forward neural network includes 3 layers with different number of neurons (e.g., 10, 10, and 1, respectively) in each layer and associated transfer function. The feed forward neural network takes the radius of curvature as an input and determines the ideal steering angle required to keep the vehicle at the center of the lane. FIG. 3B illustrates an architecture 300B of the feed forward neural network of FIG. 3A, in accordance with some embodiments of the present disclosure. In FIG. 3B, FFI_C is feed forward input curvature of a lane, Okm_FF is an output of k layer for $m^{th}$ neuron for the feed forward neural network, Wknm_FF is a weight of k layer for $n^{th}$ source and $m^{th}$ destination neuron and FFO_ST is to feed forward output steering. Example equations used to determine the ideal steering angle by the feed forward neural network is shown below:

FFO_ST=O21_FF*W311_FF+O22_FF*W321_FF+
O23_FF*W331_FF+O24_FF*W341_FF+
O25_FF*W351_FF+O26_FF*W361_FF+
O27_FF*W371_FF+O28_FF*W381_FF+
O29_FF*W391_FF+O210_FF*W3101_FF

O21_FF=tan h (O11_FF*W211_FFO12_FF*W221_FF+
O13_FF*W231_FF+O14_FF*W241_FF+
O15_FF*W251_FF+O16_FF*W261_FF+
O17_FF*W271_FF+O18_FF*W281_FF+
O19_FF*W291_FF+O110_FF*W2101_FF)

O22_FF=tan h (O12_FF*W221_FFO12_FF*W222_FF+
O13_FF*W232_FF+O14_FF*W242_FF+
O15_FF*W252_FF+O16_FF*W262_FF+
O17_FF*W272_FF+O18_FF*W282_FF+
O19_FF*W292_FF+O110_FF*W2102_FF)

O23_FF=tan h (O13_FF*W231_FFO12_FF*W233_FF+
O13_FF*W233_FF+O14_FF*W243_FF+
O15_FF*W253_FF+O16_FF*W263_FF+

O17_FF*W273_FF+O18_FF*W283_FF+
O19_FF*W293_FF+O110_FF*W2103_FF)
O24_FF=tan h (O14_FF*W241_FFO12_FF*W224_FF+
O13_FF*W234_FF+O14_FF*W244_FF+
O15_FF*W254_FF+O16_FF*W264_FF+
O17_FF*W274_FF+O18_FF*W284_FF+
O19_FF*W294_FF+O110_FF*W2104_FF)
O25_FF=tan h (O15_FF*W251_FFO12_FF*W225_FF+
O13_FF*W235_FF+O14_FF*W245_FF+
O15_FF*W255_FF+O16_FF*W265_FF+
O17_FF*W275_FF+O18_FF*W285_FF+
O19_FF*W295_FF+O110_FF*W2105_FF)
O26_FF=tan h (O16_FF*W261_FFO12_FF*W226_FF+
O13_FF*W236_FF+O14_FF*W246_FF+
O15_FF*W256_FF+O16_FF*W266_FF+
O17_FF*W276_FF+O18_FF*W286_FF+
O19_FF*W296_FF+O110_FF*W2106_FF)
O27_FF=tan h (O17_FF*W271_FFO12_FF*W227_FF+
O13_FF*W237_FF+O27_FF=tan h
(O17_FF*W271_FFO12_FF*W227_FF+
O13_FF*W237_FF+O14_FF*W247_FF+
O15_FF*W257_FF+O16_FF*W267_FF+
O17_FF*W277_FF+O18_FF*W287_FF+
O19_FF*W297_FF+O110_FF*W2107_FF)
O28_FF=tan h (O18_FF*W281_FFO12_FF*W228_FF+
O13_FF*W238_FF+O14_FF*W248_FF+
O15_FF*W258_FF+O16_FF*W268_FF+
O17_FF*W278_FF+O18_FF*W288_FF+
O19_FF*W298_FF+O110_FF*W2108_FF)
O29_FF=tan h (O19_FF*W291_FFO12_FF*W229_FF+
O13_FF*W239_FF+O14_FF*W249_FF+
O15_FF*W259_FF+O16_FF*W269_FF+
O17_FF*W279_FF+O18_FF*W289_FF+
O19_FF*W299_FF+O110_FF*W2109_FF)
O210_FF=tan h
(O110_FF*W2101_FFO12_FF*W2210_FF+
O13_FF*W2310_FF+O14_FF*W2410_FF+
O15_FF*W2510_FF+O16_FF*W2610_FF+
O17_FF*W2710_FF+O18_FF*W2810_FF+
O19_FF*W2910_FF+O110_FF*W21010_FF)
O11_FF=tan h (FFI_C*W111_FF)
O12_FF=tan h (FFI_C*W112_FF)
O13_FF=tan h (FFI_C*W113_FF)
O14_FF=tan h (FFI_C*W114_FF)
O15_FF=tan h (FFI_C*W115_FF)
O16_FF=tan h (FFI_C*W116_FF)
O17_FF=tan h (FFI_C*W117_FF)
O18_FF=tan h (FFI_C*W118_FF)
O19_FF=tan h (FFI_C*W119_FF)
O110_FF=tan h (FFI_C*W110_FF)

FIG. 4A illustrates a structural block diagram 400A of a feedback neural network, in accordance with some embodiments of the present disclosure. As shown in FIG. 4A, the feedback neural network includes 3 layers with different number of neurons (e.g., 20, 20, and 1, respectively) in each layer and associated transfer function. The feedback neural network takes the offset error, speed of the vehicle and radius of curvature as input and determines the corrective steering angle required to keep the vehicle at the center of the lane. FIG. 4B illustrates an architecture 400B of the feedback neural network of FIG. 4A, in accordance with an example embodiment. In FIG. 4B, FBI_C is feedback input curvature of a lane, FBI_V is feedback input velocity, FBI_OE is feedback input offset error, Okm_FF is an output of k layer for $m^{th}$ neuron for the feedback neural network, Wknm_FF is a weight of k layer for $n^{th}$ source and $m^{th}$ destination neuron and FBO_ST is feedback output steering.

Example equations used to determine the corrective steering angle by the feedback neural network is shown below:
FBO_ST=O21_FB*W311_FB+O22_FB*W321_FB+
O23_FB*W331_FB+O24_FB*W341_FB+
O25_FB*W351_FB+O26_FB*W361_FB+
O27_FB*W371_FB+O28_FB*W381_FB+
O29_FB*W391_FB+O210_FB*W3101_FB+
O211_FB*W3111_FB+O212_FB*W3121_FB+
O213_FB*W3131_FB+O214_FB*W3141_FB+
O215_FB*W3151_FB+O216_FB*W3161_FB+
O217_FB*W3171_FB+O218_FB*W3181_FB+
O219_FB*W3191_FB+O220_FB*W3201_FB
O21_FB=tan h (O11_FF*W211_FFO12_FB*W221_FB+
O13_FB*W231_FB+O14_FB*W241_FB+
O15_FB*W251_FB+O16_FB*W261_FB+
O17_FB*W271_FB+O18_FB*W281_FB+
O19_FB*W291_FB+O110_FB*W2101_FB+
O111_FB*W2111_FB+O112_FB*W2121_FB+
O113_FB*W2131_FB+O114_FB*W2141_FB+
O115_FB*W2151_FB+O116_FB*W2161_FB+
O117_FB*W2171_FB+O118_FB*W2181_FB+
O119_FB*W2191_FB+O220_FB*W2201_FB)
O22_FB=tan h (O12_FF*W221_FFO12_FB*W222_FB+
O13_FB*W232_FB+O14_FB*W242_FB+
O15_FB*W252_FB+O16_FB*W262_FB+
O17_FB*W272_FB+O18_FB*W282_FB+
O19_FB*W292_FB+O110_FB*W2102_FB+
O111_FB*W2112_FB+O112_FB*W2122_FB+
O113_FB*W2132_FB+O114_FB*W2142_FB+
O115_FB*W2152_FB+O116_FB*W2162_FB+
O117_FB*W2172_FB+O118_FB*W2182_FB+
O119_FB*W2192_FB+O120_FB*W2202_FB)
O23_FB=tan h (O13_FFO12_FB*W223_FB+
O13_FB*W233_FB+O14_FB*W243_FB+
O15_FB*W253_FB+O16_FB*W263_FB+
O17_FB*W273_FB+O18_FB*W283_FB+
O19_FB*W293_FB+O110_FB*W2103_FB+
O111_FB*W2113_FB+O112_FB*W2123_FB+
O113_FB*W2133_FB+O114_FB*W2143_FB+
O115_FB*W2153_FB+O116_FB*W2163_FB+
O117_FB*W2173_FB+O118_FB*W2183_FB+
O119_FB*W2193_FB+O120_FB*W2203_FB)
O24_FB=tan h (O14_FF*W241_FFO12_FB*W224_FB+
O13_FB*W234_FB+O14_FB*W244_FB+
O15_FB*W254_FB+O16_FB*W264_FB+
O17_FB*W274_FB+O18_FB*W284_FB+
O19_FB*W294_FB+O110_FB*W2104_FB+
O111_FB*W2114_FB+O112_FB*W2124_FB+
O113_FB*W2134_FB+O114_FB*W2144_FB+
O115_FB*W2154_FB+O116_FB*W2164_FB+
O117_FB*W2174_FB+O118_FB*W2184_FB+
O119_FB*W2194_FB+O120_FB*W2204_FB)
O25_FB=tan h (O15_FF*W251_FFO12_FB*W225_FB+
O13_FB*W235_FB+O14_FB*W245_FB+
O15_FB*W255_FB+O16_FB*W265_FB+
O17_FB*W275_FB+O18_FB*W285_FB+
O19_FB*W295_FB+O110_FB*W2105_FB+
O111_FB*W2115_FB+O112_FB*W2125_FB+
O113_FB*W2135_FB+O114_FB*W2145_FB+
O115_FB*W2155_FB+O116_FB*W2165_FB+
O117_FB*W2175_FB+O118_FB*W2185_FB+
O119_FB*W2195_FB+O120_FB*W2205_FB)
O26_FB=tan h (O16_FF*W261_FFO12_FB*W226_FB+
O13_FB*W236_FB+O14_FB*W246_FB+
O15_FB*W256_FB+O16_FB*W266_FB+
O17_FB*W276_FB+O18_FB*W286_FB+
O19_FB*W296_FB+O110_FB*W2106_FB+

O111_FB*W2116_FB+O112_FB*W2126_FB+
O113_FB*W2136_FB+O114_FB*W2146_FB+
O115_FB*W2156_FB+O116_FB*W2166_FB+
O117_FB*W2176_FB+O118_FB*W2186_FB+
O119_FB*W2196_FB+O120_FB*W2206_FB)
O27_FB=tan h (O17_FF*W271_FFO12_FB*W227_FB+
O13_FB*W237_FB+O14_FB*W247_FB+
O15_FB*W257_FB+O16_FB*W267_FB+
O17_FB*W277_FB+O18_FB*W287_FB+
O19_FB*W297_FB+O110_FB*W2107_FB+
O111_FB*W2117_FB+O112_FB*W2127_FB+
O113_FB*W2137_FB+O114_FB*W2147_FB+
O115_FB*W2157_FB+O116_FB*W2167_FB+
O117_FB*W2177_FB+O118_FB*W2187_FB+
O119_FB*W2197_FB+O120_FB*W2207_FB)
O28_FB=tan h (O18_FF*W281_FFO12_FB*W228_FB+
O13_FB*W238_FB+O14_FB*W248_FB+
O15_FB*W258_FB+O16_FB*W268_FB+
O17_FB*W278_FB+O18_FB*W288_FB+
O19_FB*W298_FB+O110_FB*W2108_FB+
O111_FB*W2118_FB+O112_FB*W2128_FB+
O113_FB*W2138_FB+O114_FB*W2148_FB+
O115_FB*W2158_FB+O116_FB*W2168_FB+
O117_FB*W2178_FB+O118_FB*W2188_FB+
O119_FB*W2198_FB+O120_FB*W2208_FB)
O29_FB=tan h (O19_FF*W291_FFO12_FB*W224_FB+
O13_FB*W239_FB+O14_FB*W249_FB+
O15_FB*W259_FB+O16_FB*W269_FB+
O17_FB*W279_FB+O18_FB*W289_FB+
O19_FB*W299_FB+O110_FB*W2109_FB+
O111_FB*W2119_FB+O112_FB*W2129_FB+
O113_FB*W2139_FB+O114_FB*W2149_FB+
O115_FB*W2159_FB+O116_FB*W2169_FB+
O117_FB*W2179_FB+O118_FB*W2189_FB+
O119_FB*W2199_FB+O120_FB*W2209_FB)
O210_FB=tan h
(O110_FF*W2101_FFO12_FB*W2210_FB+
O13_FB*W2310_FB+O14_FB*W2410_FB+
O15_FB*W2510_FB+O16_FB*W2610_FB+
O17_FB*W2710_FB+O18_FB*W2810_FB+
O19_FB*W2910_FB+O110_FB*W21010_FB+
O111_FB*W21110_FB+O112_FB*W21210_FB+
O113_FB*W21310_FB+O114_FB*W21410_FB+
O115_FB*W21510_FB+O116_FB*W21610_FB+
O117_FB*W21710_FB+O118_FB*W21810_FB+
O119_FB*W21910_FB+O120_FB*W22010_FB)
O211_FB=tan h
(O111_FF*W2111_FFO12_FB*W2211_FB+
O13_FB*W2311_FB+O14_FB*W2411_FB+
O15_FB*W2511_FB+O16_FB*W2611_FB+
O17_FB*W2711_FB+O18_FB*W2811_FB+
O19_FB*W2911_FB+O110_FB*W21011_FB+
O111_FB*W21111_FB+O112_FB*W21211_FB+
O113_FB*W21311_FB+O114_FB*W21411_FB+
O115_FB*W21511_FB+O116_FB*W21611_FB+
O117_FB*W21711_FB+O118_FB*W21811_FB+
O119_FB*W21911_FB+O120_FB*W22011_FB)
O212_FB=tan h
(O112_FF*W2121_FFO12_FB*W2612_FB+
O13_FB*W2312_FB+O14_FB*W2412_FB+
O15_FB*W2512_FB+O16_FB*W2612_FB+
O17_FB*W2712_FB+O18_FB*W2812_FB+
O19_FB*W2912_FB+O110_FB*W21012_FB+
O111_FB*W21112_FB+O112_FB*W21212_FB+
O113_FB*W21312_FB+O114_FB*W21412_FB+
O115_FB*W21512_FB+O116_FB*W21612_FB+
O117_FB*W21712_FB+O118_FB*W21812_FB+
O119_FB*W21912_FB+O120_FB*W22012_FB)
O213_FB=tan h
(O113_FF*W2131_FFO12_FB*W2213_FB+
O13_FB*W2313_FB+O14_FB*W2413_FB+
O15_FB*W2513_FB+O16_FB*W2613_FB+
O17_FB*W2713_FB+O18_FB*W2813_FB+
O19_FB*W2913_FB+O110_FB*W21013_FB+
O111_FB*W21113_FB+O112_FB*W21213_FB+
O113_FB*W21313_FB+O114_FB*W21413_FB+
O115_FB*W21513_FB+O116_FB*W21613_FB+
O117_FB*W21713_FB+O118_FB*W218130_FB+
O119_FB*W21913_FB+O120_FB*W22013_FB)
O214_FB=tan h
(O114_FF*W2141_FFO12_FB*W2214_FB+
O13_FB*W2314_FB+O14_FB*W2414_FB+
O15_FB*W2514_FB+O16_FB*W2614_FB+
O17_FB*W2714_FB+O18_FB*W2814_FB+
O19_FB*W2914_FB+O110_FB*W21014_FB+
O111_FB*W21114_FB+O112_FB*W21214_FB+
O113_FB*W21314_FB+O114_FB*W21414_FB+
O115_FB*W21514_FB+O116_FB*W21614_FB+
O117_FB*W21710_FB+O118_FB*W21814_FB+
O119_FB*W21914_FB+O120_FB*W22014_FB)
O211_FB=tan h
(O115_FF*W2151_FFO12_FB*W2215_FB+
O13_FB*W2315_FB+O14_FB*W2415_FB+
O15_FB*W2515_FB+O16_FB*W2615_FB+
O17_FB*W2715_FB+O18_FB*W2815_FB+
O19_FB*W2915_FB+O110_FB*W21015_FB+
O111_FB*W21115_FB+O112_FB*W21215_FB+
O113_FB*W21315_FB+O114_FB*W21415_FB+
O115_FB*W21515_FB+O116_FB*W21615_FB+
O117_FB*W21715_FB+O118_FB*W21815_FB+
O119_FB*W21915_FB+O120_FB*W22015_FB)
O216_FB=tan h
(O116_FF*W2161_FFO12_FB*W2216_FB+
O13_FB*W2316_FB+O14_FB*W2416_FB+
O15_FB*W2516_FB+O16_FB*W2616_FB+
O17_FB*W2716_FB+O18_FB*W2816_FB+
O19_FB*W2916_FB+O110_FB*W21016_FB+
O111_FB*W21116_FB+O112_FB*W21216_FB+
O113_FB*W21316_FB+O114_FB*W21416_FB+
O115_FB*W21516_FB+O116_FB*W21616_FB+
O117_FB*W21716_FB+O118_FB*W21816_FB+
O119_FB*W21916_FB+O120_FB*W22016_FB)
O217_FB=tan h
(O117_FF*W2171_FFO12_FB*W2217_FB+
O13_FB*W2317_FB+O14_FB*W2417_FB+
O15_FB*W2517_FB+O16_FB*W2617_FB+
O17_FB*W2717_FB+O18_FB*W2817_FB+
O19_FB*W2917_FB+O110_FB*W21017_FB+
O111_FB*W21117_FB+O112_FB*W21217_FB+
O113_FB*W21317_FB+O114_FB*W21417_FB+
O115_FB*W21517_FB+O116_FB*W21617_FB+
O117_FB*W21710_FB+O118_FB*W21817_FB+
O119_FB*W21917_FB+O120_FB*W22017_FB)
O218_FB=tan h
(O118_FF*W2181_FFO12_FB*W2218_FB+
O13_FB*W2318_FB+O14_FB*W2418_FB+
O15_FB*W2518_FB+O16_FB*W2618_FB+
O17_FB*W2718_FB+O18_FB*W2818_FB+
O19_FB*W2918_FB+O110_FB*W21018_FB+
O111_FB*W21118_FB+O112_FB*W21218_FB+
O113_FB*W21318_FB+O114_FB*W21418_FB+
O115_FB*W21518_FB+O116_FB*W21618_FB+
O117_FB*W21718_FB+O118_FB*W21818_FB+
O119_FB*W21918_FB+O120_FB*W22018_FB)

O219_FB=tan h (O1191_FF*W2191_FFO12_FB*W2219_FB+
O13_FB*W2319_FB+O14_FB*W2419_FB+
O15_FB*W2519_FB+O16_FB*W2619_FB+
O17_FB*W2719_FB+O18_FB*W2819_FB+
O19_FB*W2919_FB+O110_FB*W21019_FB+
O111_FB*W21119_FB+O112_FB*W21219_FB+
O113_FB*W21319_FB+O114_FB*W21419_FB+
O115_FB*W21519_FB+O116_FB*W21619_FB+
O117_FB*W21719_FB+O118_FB*W21819_FB+
O119_FB*W21919_FB+O120_FB*W22019_FB)

O220_FB=tan h (O120_FF*W2201_FFO12_FB*W2220_FB+
O13_FB*W2320_FB+O14_FB*W2420_FB+
O15_FB*W2520_FB+O16_FB*W2620_FB+
O17_FB*W2720_FB+O18_FB*W2820_FB+
O19_FB*W2920_FB+O110_FB*W21020_FB+
O111_FB*W21120_FB+O112_FB*W21220_FB+
O113_FB*W21320_FB+O114_FB*W21420_FB+
O115_FB*W21520_FB+O116_FB*W21620_FB+
O117_FB*W21720_FB+O118_FB*W21820_FB+
O119_FB*W21920_FB+O120_FB*W22020_FB)

O11_FB=tan h (FBI_C*W111_FB+FBI_V*W121_FB+FBI_OE*W131_FB)
O12_FB=tan h (FBI_C*W112_FB+FBI_V*W122_FB+FBI_OE*W132_FB)
O13_FB=tan h (FBI_C*W113_FB+FBI_V*W123_FB+FBI_OE*W133_FB)
O14_FB=tan h (FBI_C*W114_FB+FBI_V*W124_FB+FBI_OE*W134_FB)
O15_FB=tan h (FBI_C*W115_FB+FBI_V*W125_FB+FBI_OE*W135_FB)
O16_FB=tan h (FBI_C*W116_FB+FBI_V*W126_FB+FBI_OE*W136_FB)
O17_FB=tan h (FBI_C*W117_FB+FBI_V*W127_FB+FBI_OE*W137_FB)
O18_FB=tan h (FBI_C*W118_FB+FBI_V*W128_FB+FBI_OE*W138_FB)
O19_FB=tan h (FBI_C*W119_FB+FBI_V*W129_FB+FBI_OE*W139_FB)
O110_FB=tan h (FBI_C*W1110_FB+FBI_V*W1210_FB+FBI_OE*W1310_FB)
O111_FB=tan h (FBI_C*W1111_FB+FBI_V*W1211_FB+FBI_OE*W1311_FB)
O112_FB=tan h (FBI_C*W1112_FB+FBI_V*W1212_FB+FBI_OE*W1312_FB)
O113_FB=tan h (FBI_C*W1113_FB+FBI_V*W1213_FB+FBI_OE*W1313_FB)
O114_FB=tan h (FBI_C*W1114_FB+FBI_V*W1214_FB+FBI_OE*W1314_FB)
O115_FB=tan h (FBI_C*W1115_FB+FBI_V*W1215_FB+FBI_OE*W1315_FB)
O116_FB=tan h (FBI_C*W1116_FB+FBI_V*W1216_FB+FBI_OE*W1316_FB)
O117_FB=tan h (FBI_C*W1117_FB+FBI_V*W1217_FB+FBI_OE*W1317_FB)
O118_FB=tan h (FBI_C*W1118_FB+FBI_V*W1218_FB+FBI_OE*W1318_FB)
O119_FB=tan h (FBI_C*W1119_FB+FBI_V*W1219_FB+FBI_OE*W1319_FB)
O120_FB=tan h (FBI_C*W1120_FB+FBI_V*W1220_FB+FBI_OE*W1320_FB)

Figure 6:
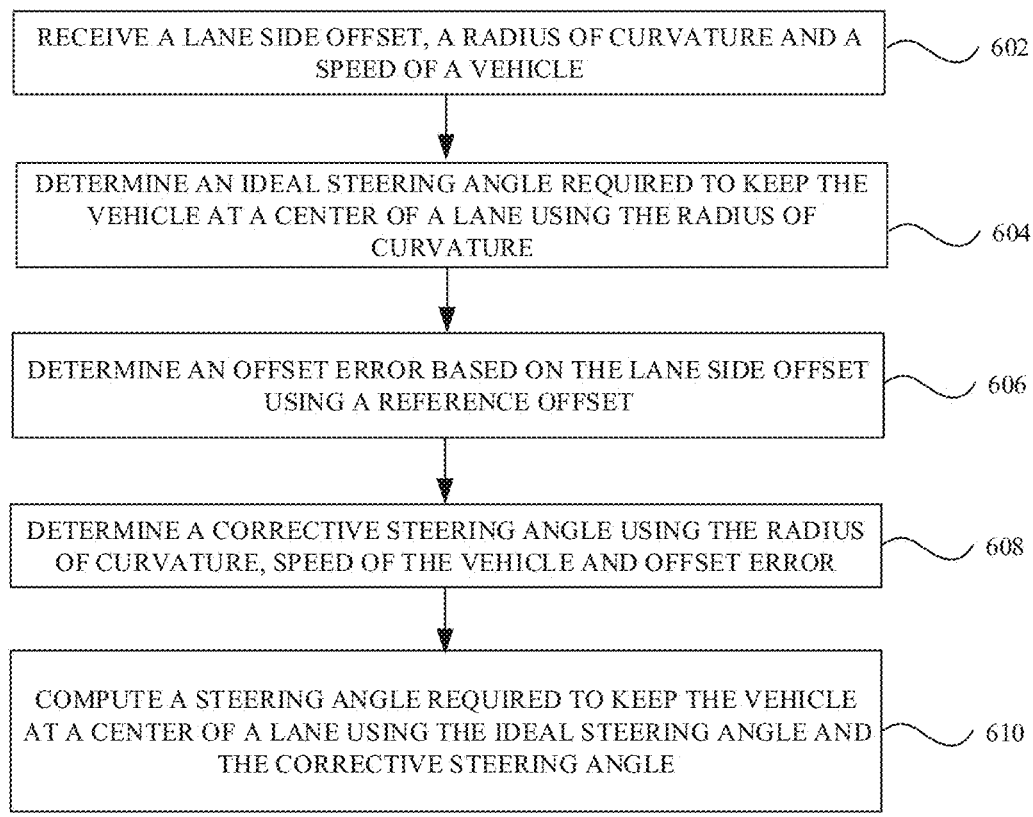
FIG. 6 illustrates a flow diagram of a method for steering control during autonomous vehicle driving, in accordance with some embodiments of the present disclosure.

FIG. 6 illustrates a flow diagram of a method 600 for steering control during autonomous vehicle driving, in accordance with some embodiments of the present disclosure. The method 800 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communication network. The order in which the method 600 is described is not intended to be construed as a limitation, and any number of the described method blocks can be combined in any order to implement the method 600, or an alternative method. Furthermore, the method 600 can be implemented in any suitable hardware, software, firmware, or combination thereof. In an embodiment, the method 800 depicted in the flow chart may be executed by a system, for example, the system 100 of FIG. 1.

At block 602, a lane side offset from a camera mounting position on a vehicle, a radius of curvature and a speed of the vehicle are received. At block 804, an ideal steering angle required to keep the vehicle at a center of a lane is determined using the radius of curvature. In an example embodiment, the radius of curvature is inputted to a first neural network and the ideal steering angle required to keep the vehicle at the center of the lane is then determined using the first neural network.

At block 606, an offset error is determined based on the lane side offset using a reference offset. At block 608, a corrective steering angle is determined using on the radius of curvature, speed of the vehicle and offset error. In an example embodiment, the radius of curvature, speed of the vehicle and offset error are inputted to a second neural network. The corrective steering angle required to keep the vehicle at the center of the lane is then determined using the second neural network. At block 610, a steering angle required to keep the vehicle at a center of a lane is computed using the ideal steering angle and the corrective steering angle.

In some embodiments, a steering angle to move the vehicle to an end of a current lane is determined by modifying the offset error. Upon reaching the end of the current lane marking, performing a lane change operation based on visibility of next lane marking. In an embodiment, a lane offset error to keep the vehicle at a center of next lane is determined using an offset from current lane offset and a lane width when the next left lane marking is not visible and the offset from current lane marking is available after crossing the current lane. Further, a steering angle is determined based on the lane offset error to perform the lane change operation. In another embodiment, the steering angle is changed in opposite direction with a value as used to move the vehicle at the end of the current lane marking when the next lane marking is not visible after traveling a distance and the current lane marking is not visible. For example, the distance is computed based on a lane width and an angle between vehicle heading and the current lane marking. This is explained in more detail with reference to FIGS. 1-5.

The order in which the method(s) are described is not intended to be construed as a limitation, and any number of the described method blocks can be combined in any order to implement the method 600, or an alternative method. Additionally, individual blocks may be deleted from the methods without departing from the spirit and scope of the subject matter described herein. Furthermore, the method 600 can be implemented in any suitable hardware, software, firmware, or combination thereof.

In an implementation, one or more of the method(s) described herein may be implemented at least in part as instructions embodied in non-transitory computer-readable storage medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method comprising:
   receiving, by one or more hardware processors, a lane side offset, a radius of curvature and a speed of a vehicle;
   determining, by the one or more hardware processors, an ideal steering angle required to keep the vehicle at a center of a lane by using the radius of curvature as input to a first neural network;
   determining, by the one or more hardware processors, an offset error based on the lane side offset using a reference offset;
   determining, by the one or more hardware processors, a corrective steering angle using the radius of curvature, speed of the vehicle and offset error as input to a second neural network;
   computing, by the one or more hardware processors, a steering angle required to keep the vehicle at a center of a lane using the ideal steering angle and the corrective steering angle; and
   performing a lane change operation based on visibility of the next lane marking by calculating a lane offset error using lane width.

2. The method of claim 1, further comprising:
   determining a steering angle to move the vehicle to an end of a current lane marking by modifying the offset error; and
   upon reaching the end of the current lane marking, performing a lane change operation based on visibility of next lane marking.

3. The method of claim 1, wherein performing the lane change operation based on visibility of the next lane marking comprises:
   calculating a lane offset error to keep the vehicle at a center of next lane using an offset from a current lane offset and a lane width when the next left lane marking is not visible and the offset from current lane marking is available after crossing the current lane; and
   determining a steering angle based on the lane offset error to perform the lane change operation.

4. The method of claim 1, wherein performing the lane change operation based on visibility of the next lane marking comprises:
   changing the steering angle in opposite direction with a value as used to move the vehicle at the end of the current lane marking when the next lane marking is not visible after traveling a distance and the current lane marking is not visible.

5. The method of claim 4, wherein the distance is computed based on a lane width and an angle between vehicle heading and the current lane marking.

6. The method of claim 1, wherein the first neural network is a feed forward neural network.

7. The method of claim 1, wherein the second neural network is a feed forward neural network.

8. A system comprising:
   one or more memories; and
   one or more hardware processors, the one or more memories coupled to the one or more hardware processors, wherein the one or more hardware processors are configured to execute programmed instructions stored in the one or more memories to:
   receive a lane side offset, a radius of curvature and a speed of a vehicle;
   determine an ideal steering angle required to keep the vehicle at a center of a lane using the radius of curvature as input to a first neural network;
   determine an offset error based on the lane side offset using a reference offset;
   determine a corrective steering angle using the radius of curvature, speed of the vehicle and offset error as input to a second neural network;
   compute a steering angle required to keep the vehicle at a center of a lane using the ideal steering angle and the corrective steering angle; and performing a lane change operation based on visibility of the next lane marking by calculating a lane offset error using lane width.

9. The system of claim 8, wherein the one or more hardware processors are further configured to execute the programmed instructions to:
determine a steering angle to move the vehicle to an end of a current lane marking by modifying the offset error; and
upon reaching the end of the current lane marking, perform a lane change operation based on visibility of next lane marking.

10. The system of claim 8, wherein the one or more hardware processors are further configured to execute the programmed instructions to:
calculate a lane offset error to keep the vehicle at a center of next lane using an offset from a current lane offset and a lane width when the next lane marking is not visible and the offset from current lane marking is available after crossing the current left lane; and
determine a steering angle based on the lane offset error to perform the lane change operation.

11. The system of claim 8, wherein the one or more hardware processors are further configured to execute the programmed instructions to:
change the steering angle in opposite direction with a value as used to move the vehicle at the end of the current lane marking when the next lane marking is not visible after traveling a distance and the current lane marking is not visible.

12. The system of claim 11, wherein the distance is computed based on a lane width and an angle between vehicle heading and the current lane marking.

13. The system of claim 8, wherein the first neural network is a feed forward neural network.

14. The system of claim 8, wherein the second neural network is a feed forward neural network.

15. A non-transitory computer readable medium embodying a program executable in a computing device, said program comprising:
a program code for receiving a lane side offset, a radius of curvature and a speed of a vehicle;
a program code for determining an ideal steering angle required to keep the vehicle at a center of a lane using the radius of curvature as input to a first neural network;
a program code for determining an offset error based on the lane side offset using a reference offset;
a program code for determining a corrective steering angle using the radius of curvature, speed of the vehicle and offset error as input to a second neural network;
a program code for computing a steering angle required to keep the vehicle at a center of a lane using the ideal steering angle and the corrective steering angle; and
performing a lane change operation based on visibility of the next lane marking by calculating a lane offset error using lane width.

* * * * *